(12) United States Patent
Owens

(10) Patent No.: US 11,024,309 B2
(45) Date of Patent: Jun. 1, 2021

(54) PORTABLE AUDIO DEVICE WITH VOICE CAPABILITIES

(71) Applicant: HARMAN INTERNATIONAL INDUSTRIES, INCORPORATED, Stamford, CT (US)

(72) Inventor: David Owens, Lawrence, KS (US)

(73) Assignee: Harman International Industries, Incorporated, Stamford, CT (US)

( * ) Notice: Subject to any disclaimer, the term of this patent is extended or adjusted under 35 U.S.C. 154(b) by 121 days.

(21) Appl. No.: 16/342,517

(22) PCT Filed: Oct. 16, 2017

(86) PCT No.: PCT/US2017/056828
§ 371 (c)(1),
(2) Date: Apr. 16, 2019

(87) PCT Pub. No.: WO2018/075417
PCT Pub. Date: Apr. 26, 2018

(65) Prior Publication Data
US 2019/0267005 A1 Aug. 29, 2019

Related U.S. Application Data

(60) Provisional application No. 62/409,287, filed on Oct. 17, 2016.

(51) Int. Cl.
| | |
|---|---|
| *G10L 15/22* | (2006.01) |
| *G06F 3/16* | (2006.01) |
| *G10L 15/18* | (2013.01) |
| *H04R 1/02* | (2006.01) |
| *H04R 1/40* | (2006.01) |

(Continued)

(52) U.S. Cl.
CPC .............. *G10L 15/22* (2013.01); *G06F 3/167* (2013.01); *G10L 15/18* (2013.01); *H04R 1/025* (2013.01);
(Continued)

(58) Field of Classification Search
CPC ......... G10L 15/22; G10L 15/00; G10L 15/18; G10L 15/20; G10L 15/26
(Continued)

(56) References Cited

U.S. PATENT DOCUMENTS

| | | | |
|---|---|---|---|
| 8,768,712 B1 | 7/2014 | Sharifi | |
| 8,971,543 B1 * | 3/2015 | List | ......................... H04R 5/00 381/17 |

(Continued)

FOREIGN PATENT DOCUMENTS

WO 2017/058648 A1 4/2017

OTHER PUBLICATIONS

Extended European Search Report for application No. 17862881.4 dated Feb. 27, 2020.
(Continued)

*Primary Examiner* — Qi Han
(74) *Attorney, Agent, or Firm* — Artegis Law Group, LLP

(57) ABSTRACT

A portable audio device that includes a network card able to connect with a WLAN and a wireless modem to connect to a WWAN. The portable audio device communicates with a voices services platform and/or content provider via the network card and WLAN or the wireless modem and WWAN. If the portable audio device does not have access to the WLAN, the portable audio device may process and respond to voice queries by communicating with the voice services platform via the wireless modem and WWAN. The portable audio device also includes a battery that provides power for the various hardware and software components of the portable audio device to perform various functions, such as advanced voice functions. The portable audio device provides true portability and may be used in any environment, such as within a home or building environment or outside of the home or building environment.

23 Claims, 5 Drawing Sheets

(51) Int. Cl.
*H04W 48/18* (2009.01)
*G10L 15/08* (2006.01)
*H04W 84/04* (2009.01)

(52) U.S. Cl.
CPC ............. *H04R 1/403* (2013.01); *H04R 1/406* (2013.01); *H04W 48/18* (2013.01); *G10L 2015/088* (2013.01); *G10L 2015/223* (2013.01); *H04R 2499/11* (2013.01); *H04W 84/04* (2013.01)

(58) Field of Classification Search
USPC ............. 704/257, 235, 245, 251, 270, 270.1
See application file for complete search history.

(56) References Cited

U.S. PATENT DOCUMENTS

| | | |
|---|---|---|
| 9,319,782 B1 | 4/2016 | Crump et al. |
| 10,147,441 B1 * | 12/2018 | Pogue ..................... G10L 25/00 |
| 10,332,513 B1 * | 6/2019 | D'Souza ................ G10L 15/183 |
| 2008/0113692 A1 | 5/2008 | Zhao et al. |
| 2011/0208520 A1 | 8/2011 | Lee |
| 2013/0293670 A1 | 11/2013 | Ayoub et al. |
| 2015/0006176 A1 | 1/2015 | Pogue et al. |
| 2015/0194152 A1 | 7/2015 | Katuri et al. |
| 2015/0278348 A1 * | 10/2015 | Paruchuri ............. G06F 16/335 707/771 |

OTHER PUBLICATIONS

Anonymous, "Review: Amazon Tap unboxing and hands-on review", Retrieved from the Internet:URL:https://homeupgraded.com/2016/04/03/review-amazon-tap-unboxing-and-hands-on-review/ [retrieved on Jan. 5, 2018], XP055438453, Apr. 3, 2016, 18 pages.
International Search Report for Application No. PCT/US2017/056828, Dec. 14, 2017, 15 pages.

* cited by examiner

PORTABLE AUDIO DEVICE WITH VOICE CAPABILITIES

CROSS-REFERENCE TO RELATED APPLICATIONS

The present application is a national stage application of the international application titled, "PORTABLE AUDIO DEVICE WITH VOICE CAPABILITIES," filed on Oct. 16, 2017, and having application number PCT/US2017/056828, which claims priority benefit of the U.S. Provisional Patent Application titled, "PORTABLE AUDIO DEVICE WITH VOICE CAPABILITIES," filed on Oct. 17, 2016, and having Ser. No. 62/409,287. The subject matter of these related applications is hereby incorporated herein by reference.

BACKGROUND

Field of the Embodiments of the Present Disclosure

Embodiments of the present disclosure relate generally to audio devices and, more specifically, to a portable audio device with voice capabilities.

Description of the Related Art

Voice assistance devices (VADs) capable of receiving and processing voice queries are becoming more popular with users. Examples of popular VADs include Amazon Echo and Google Home. A VAD provides a convenient voice-based interface for users to request particular items (such as digital media items or information items) from the Internet and receive a response from the VAD via a speaker of the VAD. For example, a user may submit a verbal query for a particular audio-based media item, such as a music track, streaming podcast, or audiobook. The VAD processes the verbal and connects to a local area network (LAN) to retrieve the requested media item from the Internet, and then outputs the requested media item via the speaker. To process a user query, the VAD may further utilize a voice services platform (VSP), which interacts with one or more content providers to retrieve the requested media item or information item.

One drawback of the above voice assistance devices is that the devices are only usable when connected to a LAN, such as within a home, school, or workplace. Although wireless LANs (such as Wi-Fi) are typically used with VADs, a VAD must be within the relatively short range of a wireless local area network (WLAN) to be usable. Further, VADs are conventionally powered via an AC power plug connected to a wall outlet of a house or building. Thus, conventional VADs are essentially tethered to the limited area of a house or building due to the short local coverage area of the required WLAN connection and the power plug and outlet requirements. The lack of portability of conventional VADs has restricted the use of VADs to home or building environments, whereby VADs are typically unusable outside such limited environments.

As the foregoing illustrates, more effective techniques for using VADs in environments outside of homes or buildings would be useful.

SUMMARY

Various embodiments set forth a portable audio device comprising a set of one or more far-field microphones configured to acquire a voice query, a set of one or more speakers, a wireless modem configured to connect to a wireless wide area network (WWAN), a memory that includes an audio processing application, and a processor that is coupled to the memory and, when executing the audio processing application, is configured to perform a set of steps. The set of steps include generating a data request based on the voice query and transmitting the data request to the WWAN via the wireless modem. The set of steps also include receiving a data response associated with the data request from the WWAN via the wireless modem. The set of steps further include generating an audio signal based on the data response and transmitting the audio signal to the set of speakers to generate audio output.

Other embodiments include, without limitation, a computer readable medium including instructions for performing one or more aspects of the disclosed techniques, as well as a method for performing one or more aspects of the disclosed techniques.

At least one advantage of the disclosed approach is that the portable audio device is able to process voice queries and provide a response to the voice queries even when the portable audio device is not within range of a WLAN and is not receiving power from a wall outlet. Thus, the portable audio device provides true portability and may be used in any environment, such as within a home or building environment or outside of the home or building environment.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
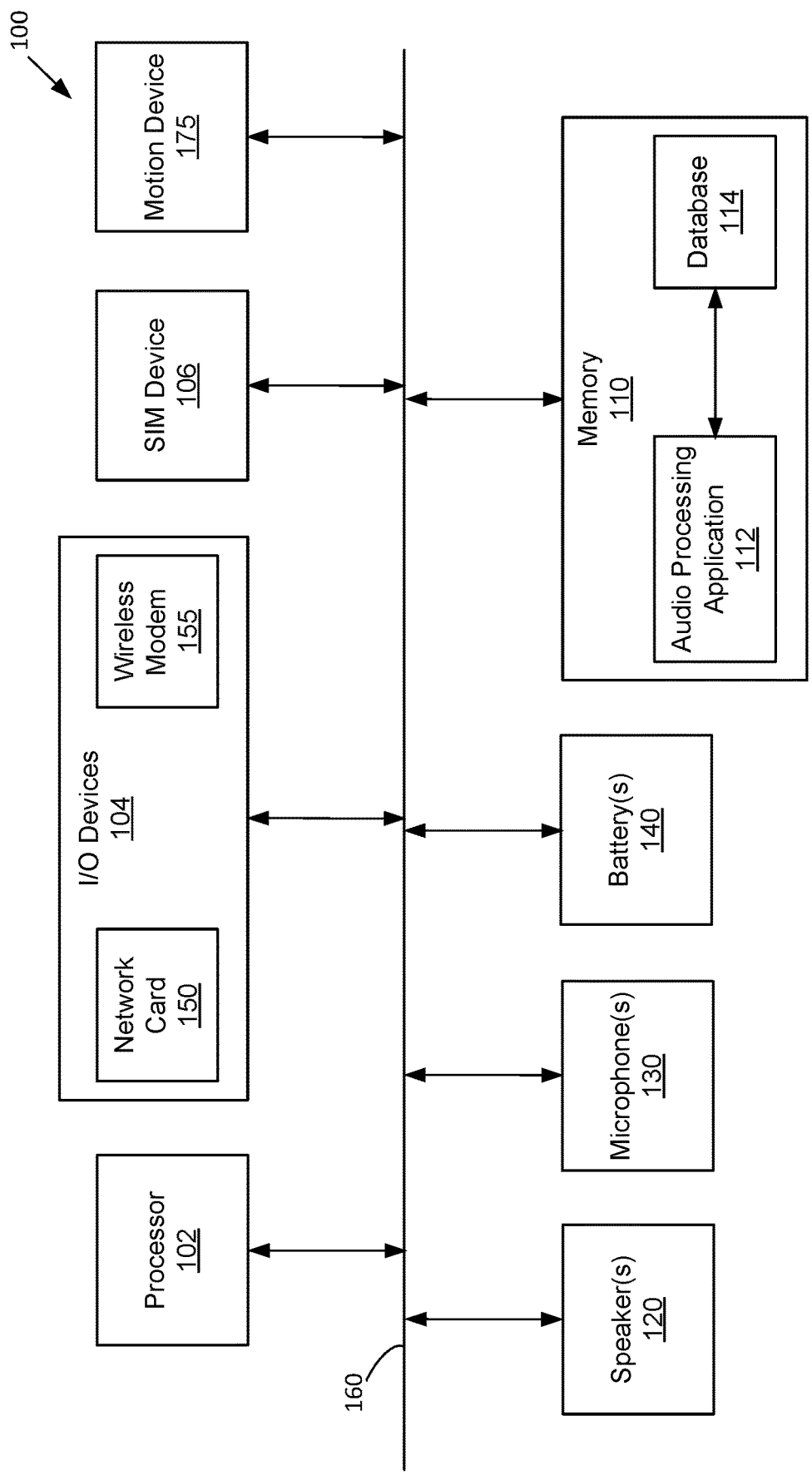
FIG. 1 is a conceptual block diagram of a portable audio device configured to implement one or more aspects of the various embodiments.

FIG. 1 is a conceptual block diagram of a portable audio device 100 configured to implement one or more aspects of the various embodiments. As shown, the portable audio device 100 includes a processor 102, input/output (I/O) devices 104 (including a network card 150 and a wireless modem 155), a subscriber identity module (SIM) device 106, a memory 110, a set of one or more speakers 120, a set of one or more microphones 130, a motion device 175, and one or more batteries 140 that are interconnected by a bus 160. The bus 160 collectively represents all system, peripheral, and chipset buses that communicatively connect the numerous internal devices (shown in FIG. 1) of the portable audio device 100. The memory 110 includes an audio processing application 112 configured to interact with a database 114. The battery 140 provides power to the portable audio device 100 as a whole. In some embodiments, the battery 140 provides power to various hardware and/or software components including the processor 102, network card 150, wireless modem 155, SIM device 106, memory 110, set of speakers 120, set of microphones 130, or any combination thereof based on a power state of the portable audio device 100.

As described herein, the portable audio device 100 includes a wireless modem 155 that is able to communicate with a voices services platform via a wireless wide area network (WWAN). In some embodiments, when the portable audio device does not have access to a local network (e.g., a wireless local area network or "WLAN"), the portable audio device 100 can process and respond to voice queries by communicating with the voice services platform via the WWAN. Accordingly, the portable audio device 100 allows advanced voice functionality to be implemented in a dedicated audio device, such as a portable speaker, without requiring the portable audio device 100 to be connected to a local network or to a mobile device (e.g., a smartphone) of the user. Further, the portable audio device 100 optionally enables content to be received from one or more content providers, for example, in response to a voice request issued by a user. The portable audio device 100 also includes a battery 140 that provides all the power needed for the hardware and software components of the portable audio device 100 to perform the functions described herein (such as the advanced voice functionality). Thus, the portable audio device 100 does not require power from a wall outlet of a house or building to provide the advanced voice functionality described herein. In this manner, the portable audio device provides true portability and may be used in any environment, such as within a home or building environment or outside of the home or building environment.

Generally, processor 102 is configured to coordinate the overall operation of the portable audio device 100. The processor 102 may be any technically feasible form of processing device configured to process data and/or execute program code. The processor 102 could include, for example, and without limitation, a system-on-chip (SoC), a central processing unit (CPU), a graphics processing unit (GPU), an application-specific integrated circuit (ASIC), a digital signal processor (DSP), a field-programmable gate array (FPGA), and so forth. Processor 102 includes one or more processing cores. In operation, processor 102 is the master processor of portable audio device 100, controlling and coordinating operations of other system components.

I/O devices 104 may include input devices, output devices, and devices capable of both receiving input and providing output. For example, and without limitation, I/O devices 104 could include wired and/or wireless communication devices that send data to and/or receive data from the mobile computing devices, mobile phones, the speaker(s) 120, the microphone(s) 130, remote databases, other types of audio devices, other types of computing devices, etc. In some embodiments, the I/O devices 104 may include a Bluetooth® device for communicating wirelessly with one or more other devices.

Additionally, in some embodiments, the I/O devices 104 include a network card 150 and a wireless modem 155. In some embodiments, the network card 150 connects with a first type of network (non-cellular network) and the wireless modem 155 connects with a second type of network (cellular network), the first and second types of networks comprising different types of networks. The network card 150 may comprise a network interface controller (NIC), network adapter, LAN adapter, physical network interface, or similar computer hardware component that connects the portable audio device 100 to a non-cellular network, such as a local area network (LAN) or wireless local area network (WLAN), for communicating with the non-cellular network. The wireless modem 155 may comprise a mobile broadband modem, Long-Term Evolution (LTE) modem, or similar computer hardware component that connects the portable audio device 100 to a cellular network, such as a wireless wide area network (WWAN), for communicating with the cellular network.

The SIM device 106 interfaces with one or more subscriber identification modules (SIM) cards that store subscriber information associated with one or more WWANs. For example, a SIM card may comprise an integrated circuit for securely storing an international mobile subscriber identity (IMSI) number and its related key, which are used to identify and authenticate subscribers using the portable audio device 100. In some embodiments, the SIM device 106 communicates with one or more I/O devices 104, such as the wireless modem 155, to enable the I/O device(s) 104 to authenticate and connect with a WWAN. In some embodiments, the portable audio device 100 connects to the WWAN via the wireless modem 155, e.g., based on subscriber information that is read from a SIM card via the SIM device 106.

The microphone(s) 130 are configured to acquire acoustic data from the surrounding environment and transmit signals associated with the acoustic data to the audio processing application 112 for processing. For example, the acoustic data acquired by the microphone(s) 130 could be processed by the portable audio device 100 (e.g., by the audio processing application 112) to detect a "wake" command intended to wake the portable audio device 100 from a low-power state. The wake command may comprise a specific "wake word" comprising a unique name, word, or phrase that is recognized by the audio processing application 112. The portable audio device 100 may be pre-configured with a specific wake command that is stored to memory 110. The wake command may be also be changed by the user to another wake word. In response to receiving and detecting the wake command, the audio processing application 112 may exit the low-power state (sleep state) and transition the portable audio device 100 to a normal-power state (awake state) used to receive and process voice queries. After the portable audio device 100 is awakened (transitioned to the normal-power state), the microphone(s) 130 may acquire acoustic data comprising a voice query from a user and transmit signals associated with the voice query to the audio processing application 112 for processing.

In various embodiments, the set of one or more microphones 130 may include any type of transducer capable of acquiring acoustic data, including, for example and without limitation, a differential microphone, a piezoelectric microphone, an optical microphone, etc. In some embodiments, the microphones 130 may implement microwave technology to detect sounds (e.g., voices) within a particular environment. In further embodiments, the microphones 130 could implement far-field technology to acquire/detect the voice (acoustic data) of a user from a particular distance (e.g., up to 25 feet away). Thus, a user does need to be relatively close to the portable audio device 100 for the microphones 130 to acquire/detect a wake command and/or voice queries from the user. For example, the set of microphones 130 may comprise a plurality of far-field microphones 130. A far-field microphone is distinct from a near-field microphone which requires a user to speak relatively closely (e.g., within 12 inches) to the near-field microphone for the microphone to acquire sufficiently accurate acoustic data for voice processing. In contrast, a far-field microphone may acquire sufficiently accurate acoustic data (spoken voice) from a user at greater distances for voice processing than obtainable by a near-field microphone. For example, the set of microphones 130 may comprise one or more far-field microphones that can acquire/detect the voice of a user for voice processing purposes from various distances (such as up to 15 feet away, 20 feet away, or 25 feet away).

Memory 110 may include a memory module or a collection of memory modules. The audio processing application 112 within memory 110 is executed by the processor 102 to implement the overall functionality of the portable audio device 100 and, thus, to coordinate the operation of the portable audio device 100 as a whole. The processing performed by the audio processing application 112 may include, for example, and without limitation, filtering, voice recognition, using natural language processing (NLP), statistical analysis, heuristic processing, acoustic processing, and/or other types of data processing and analysis.

For example, in an initial state, the audio processing application 112 may operate in a low-power state to conserve power of the battery 140. While in the low-power state, the audio processing application 112 may be in an "always listening mode" that continuously monitors the acoustic data acquired via the one or more microphones 130 to continuously monitor for the wake command. In some embodiments, while in the low-power state, the audio processing application 112 may only power and activate the hardware and/or software components of the portable audio device 100 needed to monitor for the wake command, while powering down and de-activating all other hardware and/or software components of the portable audio device 100 not needed to monitor for the wake command. For example, while in the low-power state, the audio processing application 112 may only power and activate the set of microphones 130, the processor 102, and memory 110. In other embodiments, the audio processing application 112 may power on a first subset of microphones in the set of microphones 130, wherein a second subset of microphones in the set of microphones is powered off. For example, only one or two microphones in the set of microphones 130 may be powered on during the low-power state. While in the low-power state, the audio processing application 112 may also power down and de-activate the I/O devices 104 (including the network card 150 and wireless modem 155), SIM device 106, speaker(s) 120, or any combination thereof.

When the audio processing application 112 detects that acoustic data acquired by one or more microphone(s) 130 comprises the wake command, the audio processing application 112 may transition the portable audio device 100 from the low-power state (sleep state) to the normal-power state (awake state) by powering on and activating the hardware and/or software components of the portable audio device 100 needed to acquire and process voice queries. For example, in the normal-power state, the audio processing application 112 may power on and activate the second subset of microphones in the set of microphones 130 that were not powered on during the low-power state, the I/O devices 104 (including the network card 150 and wireless modem 155), SIM device 106, speaker(s) 120, or any combination thereof. Thus, in the low-power state, a lower number of hardware and/or software components of the portable audio device 100 are powered, thus requiring a lower amount of power from the battery 140 as compared to the normal-power state (which requires a higher number of hardware and/or software components of the portable audio device 100 to be powered relative to the low-power state).

After the portable audio device 100 is awakened (transitioned to the normal-power state), the audio processing application 112 continuously monitors the acoustic data received via the microphone(s) 130 to detect voice queries. The microphone(s) 130 may then acquire acoustic data comprising a voice query and transmit signals associated with the voice query to the audio processing application 112 for processing. The voice query may be processed by the audio processing application 112 to generate a data request comprising an IP data stream, the data request comprising a computer-based representation of the received voice query.

In some embodiments, the audio processing application 112 generates the data request based on the voice query by processing the voice query using natural language processing techniques. Natural language processing (NLP) may comprise a form of artificial intelligence and computational linguistics to facilitate interactions between human (natural) language and computer languages. Natural language processing may receive natural language voice queries and translate the voice queries to a computer-based data request that can be understood by computer hardware and software components. Natural language processing may be applied to the received voice queries using lexicons (dictionaries of terms) and syntax/grammar structures stored to a database 114.

The audio processing application 112 then transmits the data request to a voice services platform and/or content provider via one or more I/O devices 104. The voice services platform may process the received data request to produce a data response. The voice services platform may also utilize services of a content provider to produce the data response. The audio processing application 112 may then receive a data response for the data request from the voice services platform and/or content provider. Based on the received data response, the audio processing application 112 produces an audio response comprising audio signals. The audio processing application 112 then transmits the audio response (audio signals) to the set of speakers 120.

The set of speakers 120 are configured to generate sound (audio output) based on the audio signals received from the portable audio device 100 and/or an audio device (e.g., a power amplifier) included in the portable audio device 100. In some embodiments, the set of speakers 120 comprises a plurality of full range speakers. In further embodiments, the set of speakers 120 comprises includes an electronic crossover and a plurality of different types of drivers for producing different frequency ranges, each driver for producing a particular frequency range. For example, the set of speakers 120 may comprise a first driver between 1.25 inches and 1.75 inches and a second driver, such as a woofer, between 3.25 inches and 3.75 inches in diameter. In these embodiments, the electronic crossover comprises electronic filter circuitry to separate the received audio signal into two or more frequency ranges and transmit the audio signals to different drivers designed for the different frequency ranges. For example, the set of speakers 120 may include a first driver for a first frequency range (e.g., a low frequency range, such as less than 120 Hz) and a second driver for a second frequency range (e.g., a higher frequency range, such as greater than 120 Hz), the first and second frequency ranges being different frequency ranges.

In some embodiments, the voice query received from a user may comprise a request to playback a particular media item (e.g., "Play music track X"). In some embodiments, the particular media item may comprise an audio-based media item comprising only audio data and contains no video data (such as a music track, streaming podcast, audiobook, etc.). The voice query is processed by the audio processing application 112 (e.g., using NLP techniques) to generate a data request (IP data stream) for the particular media item. The audio processing application 112 transmits the data request to a voice services platform via one or more I/O devices 104. The voice services platform locates and retrieves the particular media item (e.g., by utilizing services of a content provider) and transmits the particular media item as a data response to the audio processing application 112. Alternatively, the voice services platform may transmit the data request to a content provider that locates and retrieves the particular media item and transmits the particular media item as a data response to the audio processing application 112. The audio processing application 112 performs playback operations on the received data response (such as decompressing, decoding, and the like) to produce an audio response comprising audio signals. The audio signals are sent to the speaker(s) 120 that generate/reproduce sound (audio output) based on the audio signals to playback the particular media item.

As another example, the voice query received from a user may comprise a request for a particular information item. For example, an information item may comprise real-time information (such as current weather, traffic, news, sports scores, stock quotes, or the like) or general information (such as general facts relating to history, science, health, hobbies, etc.). For example, a voice query for an information item may comprise a request such as: What is the weather today? Who won the Red-Sox game yesterday? What is the capitol of Florida? When did World War I end? The voice query is processed by the audio processing application 112 (e.g., using NLP techniques) to generate a data request (IP data stream) for the particular information item. The audio processing application 112 transmits the data request to a voice services platform via one or more I/O devices 104. The voice services platform locates and retrieves the particular information item (e.g., by utilizing services of a content provider) and transmits the particular information item as a data response to the audio processing application 112. Alternatively, the voice services platform may transmit the data request to a content provider that locates and retrieves the particular information item and transmits the particular information item as a data response to the audio processing application 112. The audio processing application 112 performs conversion operations on the data response to produce an audio response based on the data response. For example, the audio response may comprise an audio clip of a spoken voice response to the voice query, the voice response comprising an audio representing the data response. The audio signals are output to the speaker(s) 120 that generate sound (audio output) based on the audio signals to playback the voice response to the voice query.

In various embodiments, the components of the portable audio device 100 (e.g., the processor 102, speaker(s) 120, microphone(s) 130, battery 140, etc.) are disposed in a portable housing, enabling the portable audio device 100 to be carried to different locations, such as outside of a house or building environment. In other embodiments, the speaker(s) 120 and microphone(s) 130 may be coupled to, but separate from one or more components of the portable audio device 100. However, the embodiments disclosed herein contemplate any technically feasible system configured to implement the functionality of the portable audio device 100.

In some embodiments, the portable audio device 100 comprises a dedicated audio device configured for only performing the functions described herein. In these embodiments, the portable audio device 100 does not include a video display screen or video processing capabilities, and instead provides only audio capabilities, including audio capture, audio recording, audio processing, audio output, etc. In some embodiments, the portable audio device 100 does not include any type of phone call capabilities. In further embodiments, the portable audio device 100 does not include any hard buttons that receive user inputs, whereby all user inputs are received through audio/voice inputs. By not including such features as a video display screen, video capabilities, phone call capabilities, hard buttons, or any combination thereof, the cost, complexity, and power requirements of the portable audio device 100 may be significantly reduced to produce an efficient and robust dedicated audio device. In this regard, as the portable audio device 100 continually requires power from the battery 140 to monitor for the wake command in low-power mode, the elimination of a video display screen and video and phone call capabilities may also assist in conserving the power of the battery 140. Additionally, by not including a video display screen, which is commonly prone to damage (e.g., cracking), the overall durability of the portable audio device 100 may be improved.

Figure 2:
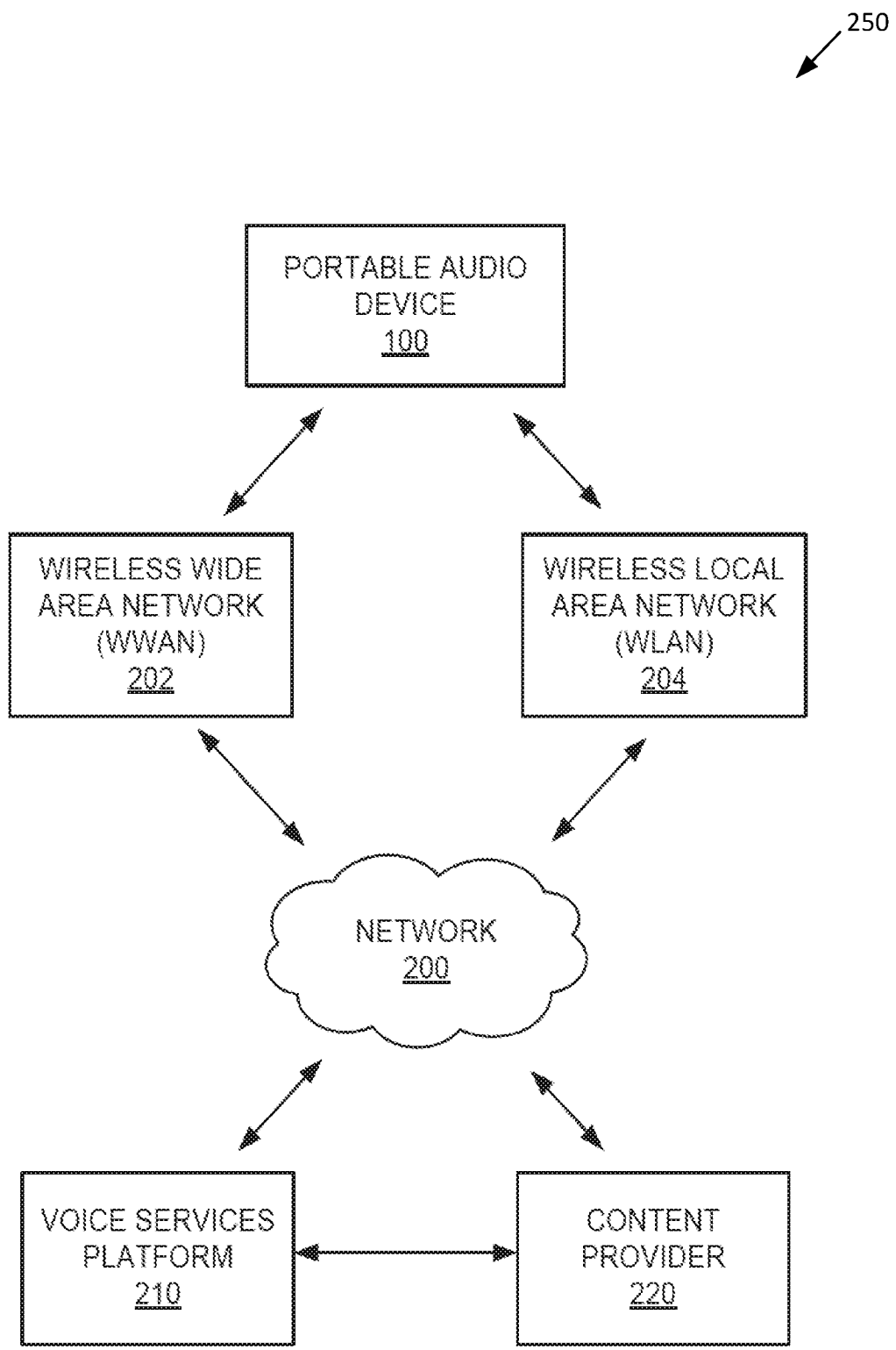
FIG. 2 is a conceptual illustration of a communications environment in which the portable audio device of FIG. 1 may be implemented, according to one or more aspects of the various embodiments.

FIG. 2 is a conceptual illustration of a communications environment 250 in which the portable audio device 100 of FIG. 1 may be implemented, according to one or more aspects of the various embodiments. As shown, the portable audio device 100 may communicate with a voice services platform 210 and/or a content provider 220 via a wireless wide area network (WWAN) 202 and/or via wireless local area network (WLAN) 204. The voice services platform 210 and content provider 220 may communicate with the wireless wide area network (WWAN) 202 and/or the wireless local area network (WLAN) 204 via a communications network 200, such as the Internet.

In various embodiments, the WWAN 202 may include a long-term evolution (LTE) network, a global system for mobile communications (GSM) network, a code division multiple access (CDMA) network, a worldwide interoperability for microwave access (WiMAX) network, and/or any other type of wireless wide area network. WLAN 204 may include any type of wireless local area network, such as a Wi-Fi network (e.g., an IEEE 802.11 network). In general, the WLAN 204 may comprise a first type of network (non-cellular network) and the WWAN 202 may comprise a second type of network (cellular network), the first and second types of networks comprising different types of networks. The WWAN 202 offers a much larger coverage range than the WLAN 204 and requires different technologies. In particular, the WWAN 202 utilizes mobile telecommunication cellular network technologies which are offered regionally, nationwide, or globally and are provided by a wireless service provider. In contrast, the WLAN 204 does not utilize mobile telecommunication cellular network technologies and provides a relatively short coverage range, typically within a home, school, or workplace environment.

In some embodiments, in response to receiving and detecting the wake command, the audio processing application 112 determines whether or not to connect to the WWAN 202 using the wireless modem 155. In particular, in response to receiving the wake command, the audio processing application 112 may then determine whether to connect to the WWAN 202 using the wireless modem 155 or connect to the WLAN 204 using the network card 150. For example, the audio processing application 112 may first determine if the portable audio device 100 is within a coverage range of the WLAN 204. If so, the audio processing application 112 may connect to the WLAN 204 using the network card 150. If not, the audio processing application 112 may connect to the WWAN 202 using the wireless modem 155.

In these embodiments, the audio processing application 112 determines whether to connect to the WWAN 202 or WLAN 204 and establishes a network connection with the WWAN 202 or WLAN 204 in response to and immediately upon receiving and detecting the wake command. Thus, soon after receiving and detecting the wake command, the portable audio device 100 is ready to receive and process voice queries using the network connection with the WWAN 202 or WLAN 204. For example, in response to receiving and detecting the wake command, the audio processing application 112 may determine to connect to the WWAN 202 and establish a network connection with the WWAN 202 by determining that the portable audio device 100 is outside the coverage range of the WLAN 204. For example, in response to receiving and detecting the wake command, the audio processing application 112 may determine to connect to the WLAN 204 and establish a network connection with the WLAN 204 by determining that the portable audio device 100 is within the coverage range of the WLAN 204. In further embodiments, the portable audio device 100 may also switch between the WWAN 202 and the WLAN 204 seamlessly, or with a short interruption in service and/or audio output.

As discussed above, while in low-power mode, the network card 150, wireless modem 155, and SIM device 106 may be powered off. In some embodiments, in response to detecting the wake command while in low-power mode, the audio processing application 112 determines whether to connect to the WWAN 202 or WLAN 204, and powers on only the components needed to establish a network connection with the WWAN 202 or WLAN 204. For example, if the audio processing application 112 determines to connect to the WWAN 202, the audio processing application 112 may only power on the wireless modem 155 and/or SIM device 106 and power off the network card 150. Thus, in response to detecting the wake command while in low-power state and determining to connect to the WWAN 202, the audio processing application 112 may only power on the wireless modem 155 and/or SIM device 106 and power off the network card 150. As another example, if the audio processing application 112 determines to connect to the WLAN 204, the audio processing application 112 may only power on the network card 150 and not power on the wireless modem 155 and/or SIM device 106 (i.e., keep the wireless modem 155 and/or SIM device 106 powered off). Thus, in response to detecting the wake command while in low-power state and determining to connect to the WLAN 204, the audio processing application 112 may only power on the network card 150 and not power on the wireless modem 155 and/or SIM device 106.

Once a network connection to the WWAN 202 or WLAN 204 is established, the portable audio device 100 may receive a voice query from a user and processes the voice query to generate a data request. The portable audio device 100 then transmits the data request to the voice services platform 210 and/or the content provider 220 via the WWAN 202 or WLAN 204 and the communications network 200 (such as the Internet). The portable audio device 100 then receives a data response from the voice services platform 210 and/or the content provider 220 via the WWAN 202 or WLAN 204 and the communications network 200. In general, the voice services platform 210 may work in conjunction with a content provider 220 to produce a data response for the data request from the portable audio device 100. A voice services platform 210 may provide an intelligent personal assistant service, such as Amazon Alexa, Google Assistant, Apple Siri, and Microsoft Cortana. A content provider 220 may comprise a web search and content server, such as Microsoft Bing servers, Google servers, or Yahoo! servers.

For example, upon detecting a voice query issued by the user, the audio processing application 112 may convert the voice query into a data request and transmit the data request to the voice services platform 210 via the WWAN 202 or WLAN 204. The voices services platform 210 may then process the data request to generate a data response, which is transmitted back to the portable audio device 100 via the WWAN 202 or WLAN 204. In some embodiments, after processing the data request, the voices services platform 210 could generate a response that is transmitted to the content provider 220. The content provider 220 could then transmit content (e.g., a media item and/or other types of data) to the portable audio device 100, the content comprising a data response for the data request. The portable audio device 100 would then produce an audio response comprising audio signals that are played through the speaker(s) 120 based on the content (data response) received from the content provider 220.

Figure 3:
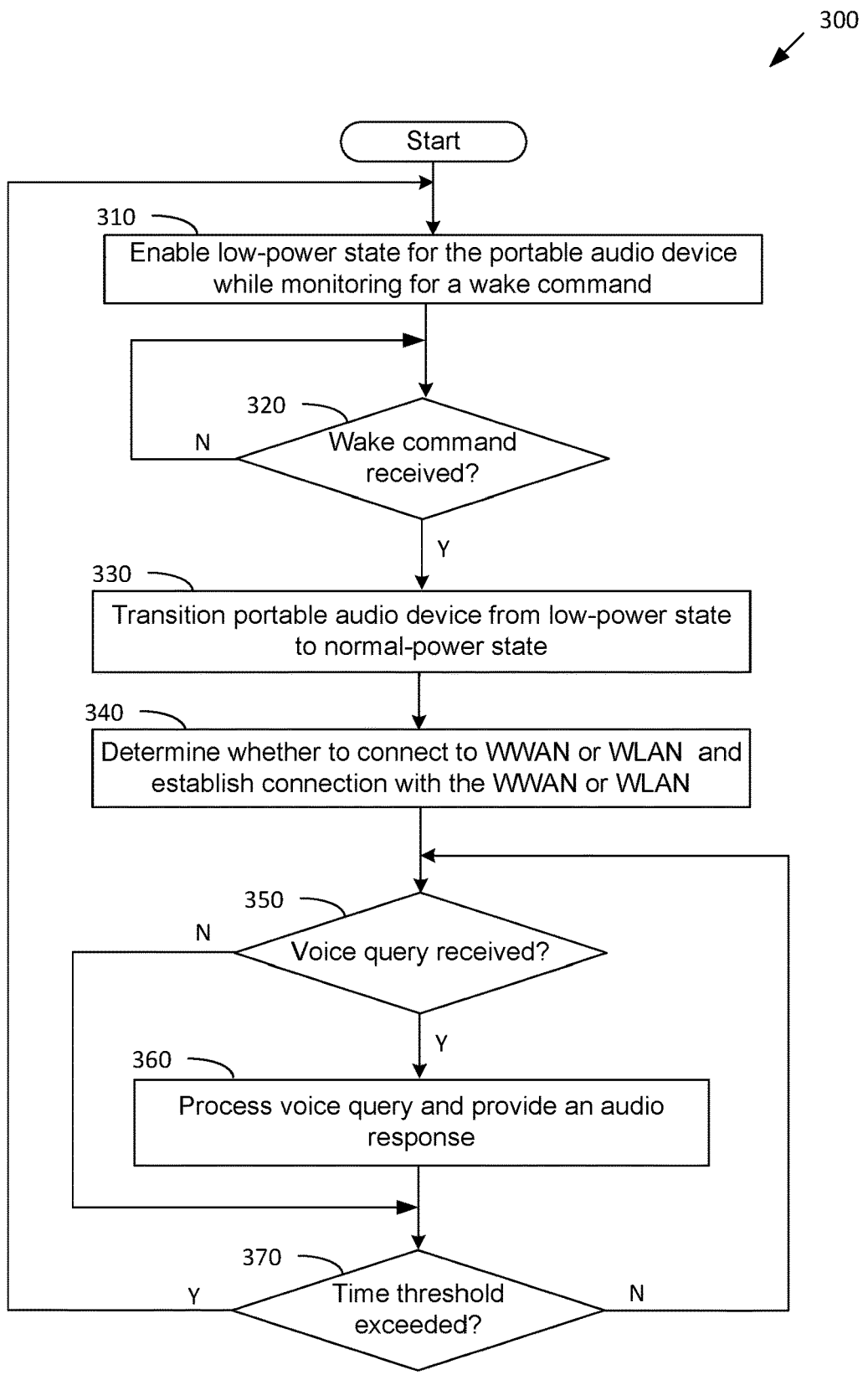
FIG. 3 is a flow diagram of method steps for performing functions of a portable audio device, according to various embodiments.

FIG. 3 is a flow diagram of method steps for performing functions of a portable audio device 100, according to various embodiments. Although the method steps are described in conjunction with the systems of FIGS. 1-2, persons skilled in the art will understand that any system configured to perform the method steps, in any order, is within the scope of the present disclosure. In some embodiments, the method 300 of FIG. 3 is performed by an audio processing application 112 executing on the portable audio device 100.

As shown, a method 300 begins at step 310, where the audio processing application 112 initially enables a low-power state for the portable audio device 100 to conserve power of the battery 140. In the low-power state, the audio processing application 112 may be in an "always listening mode" that continuously monitors the acoustic data acquired via the one or more microphones 130 to detect a wake command. In some embodiments, while in the low-power state, the audio processing application 112 may only power and activate the hardware and/or software components of the portable audio device 100 needed to monitor for the wake command, while powering down and de-activating all other hardware and/or software components of the portable audio device 100 not needed to monitor for the wake command. In some embodiments, while in the low-power state, the audio processing application 112 powers on a first set of components of the portable audio device 100 used for monitoring for the wake command, wherein a second set of components of the portable audio device 100 that are not used for monitoring for the wake command are powered off.

The audio processing application 112 then determines (at step 320) if the wake command is acquired by the one or more microphones 130 and detected. If not, the method 300 continues at step 320, whereby the audio processing application 112 continues to monitor for the wake command. If the wake command is acquired and detected, then the method 300 continues at step 330. At step 330, in response to detecting the wake command, the audio processing application 112 exits the low-power state (sleep state) and transitions the portable audio device 100 to a normal-power state (awake state). In some embodiments, in the normal-power state, the audio processing application 112 powers on the second set of components of the portable audio device 100 that were powered off during the low-power state. In other embodiments, in the normal-power state, the audio processing application 112 powers on at least one component in the second set of components of the portable audio device 100.

At step 340, also in response to detecting the wake command, the audio processing application 112 determines whether to connect to the WWAN 202 or the WLAN 204, and establish a network connection with the WWAN 202 or the WLAN 204. For example, the audio processing application 112 may determine if the portable audio device 100 is within a coverage range of the WLAN 204. If so, the audio processing application 112 may determine to connect to the WLAN 204 and establish a network connection with the WLAN 204 using the network card 150. If not, the audio processing application 112 may determine to connect to the WWAN 202 and establish a network connection with the WWAN 202 using the wireless modem 155. In some embodiments, if the audio processing application 112 determines to connect to the WWAN 202, then the audio processing application 112 may only power on the wireless modem 155 and/or SIM device 106 and power off the network card 150. Also, if the audio processing application 112 determines to connect to the WLAN 204, the audio processing application 112 may only power on the network card 150 and not power on the wireless modem 155 and/or SIM device 106.

After establishing a network connection with the WWAN 202 or WLAN 204, the audio processing application 112 determines (at step 350) whether a voice query from a user has been acquired by the one or more microphones 130 and detected. If not, the method 300 continues at step 370. If so, at step 360, the audio processing application 112 processes the voice query and provides an audio response to the user via the set of speakers 120. Step 360 is discussed in further detail below in relation to FIG. 4.

At step 370, the audio processing application 112 determines whether a predetermined time threshold is exceeded whereby no voice query has been detected by the audio processing application 112. In general, if a voice query has not been detected for a certain period of time, the audio processing application 112 may transition the portable audio device 100 from the normal-power state to the low-power state to conserver power of the battery 140. For example, if a voice query has not been detected by the audio processing application 112 for over 5 minutes, the portable audio device 100 may be returned back to low-power state. If the time threshold has not been exceeded, the method 300 continues at step 350, whereby the audio processing application 112 continually monitors for voice queries. If the time threshold has been exceeded, the method 300 continues at step 310, whereby the audio processing application 112 transitions the portable audio device 100 back to the low-power state.

Figure 4:
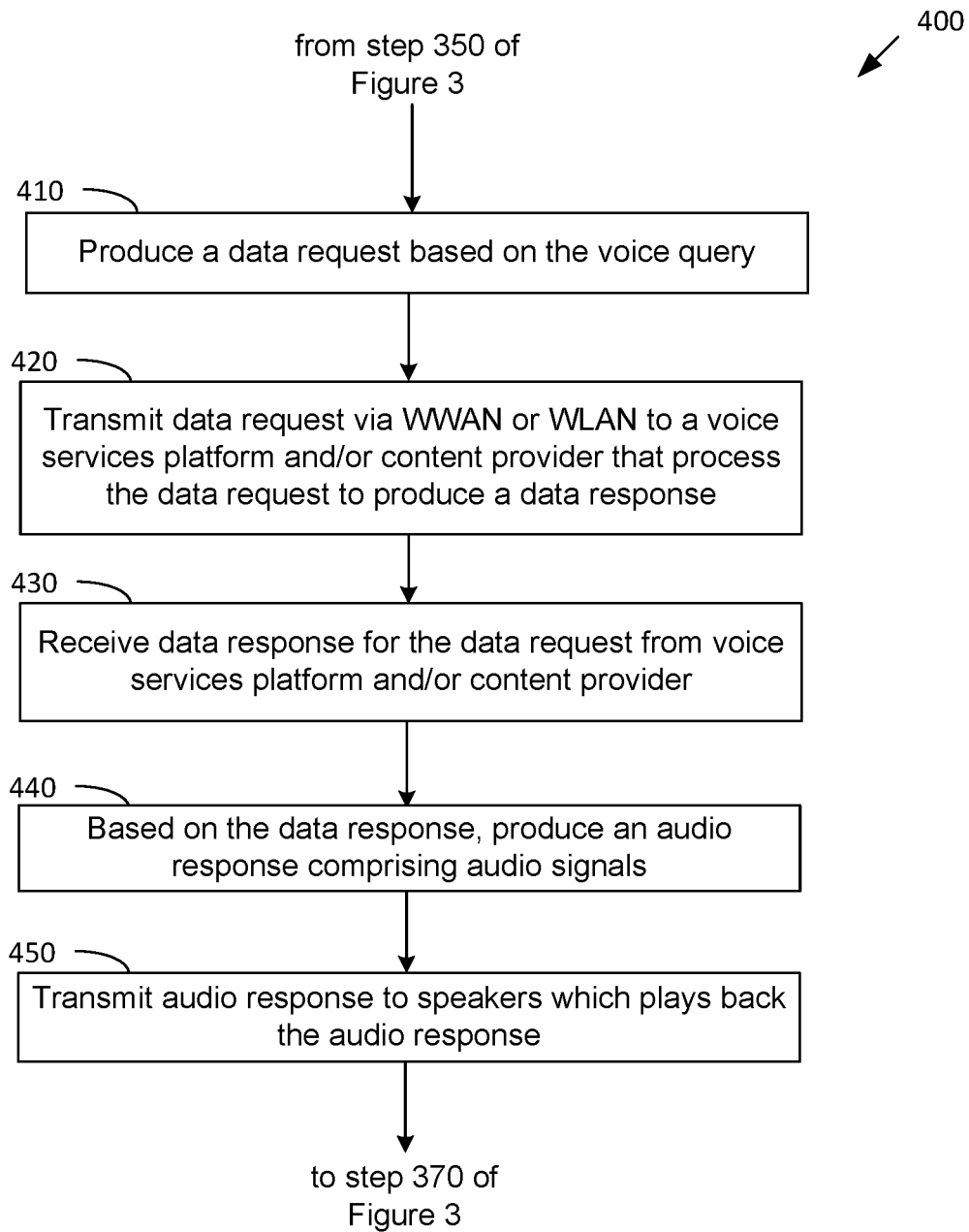
FIG. 4 is a flow diagram of method steps for processing voice queries received by a portable audio device, according to various embodiments.

FIG. 4 is a flow diagram of method steps for processing voice queries received by a portable audio device 100, according to various embodiments. Although the method steps are described in conjunction with the systems of FIGS. 1-2, persons skilled in the art will understand that any system configured to perform the method steps, in any order, is within the scope of the present disclosure. In some embodiments, the method 400 of FIG. 4 is performed by an audio processing application 112 executing on the portable audio device 100. The method 400 may comprise step 360 of FIG. 3.

As shown, the method 400 begins from step 350 of FIG. 3, whereby a voice query from a user is received. At step 410, the audio processing application 112 produces a data request based on the voice query (e.g., using NLP techniques). The data request may comprise an IP data stream and represent the received voice query. The audio processing application 112 then transmits (at step 420) the data request to a voice services platform 210 and/or content provider 220 via the WWAN 202 or WLAN 204. As shown in FIG. 2, the voice services platform 210 and content provider 220 may communicate with the WWAN 202 or WLAN 204 via a communications network 200, such as the Internet. The voice services platform 210 may process the data request to produce a data response. The voice services platform may also utilize services of a content provider 220 to produce the data response.

The audio processing application 112 then receives (at step 430) a data response for the data request from the voice services platform 210 and/or content provider 220. Based on the received data response, the audio processing application 112 then produces (at step 440) an audio response comprising audio signals. The audio processing application 112 then transmits (at step 450) the audio response to the speaker(s) 120 which reproduces/plays back the audio response. The method 400 then returns to step 370 of FIG. 3.

Figure 5:
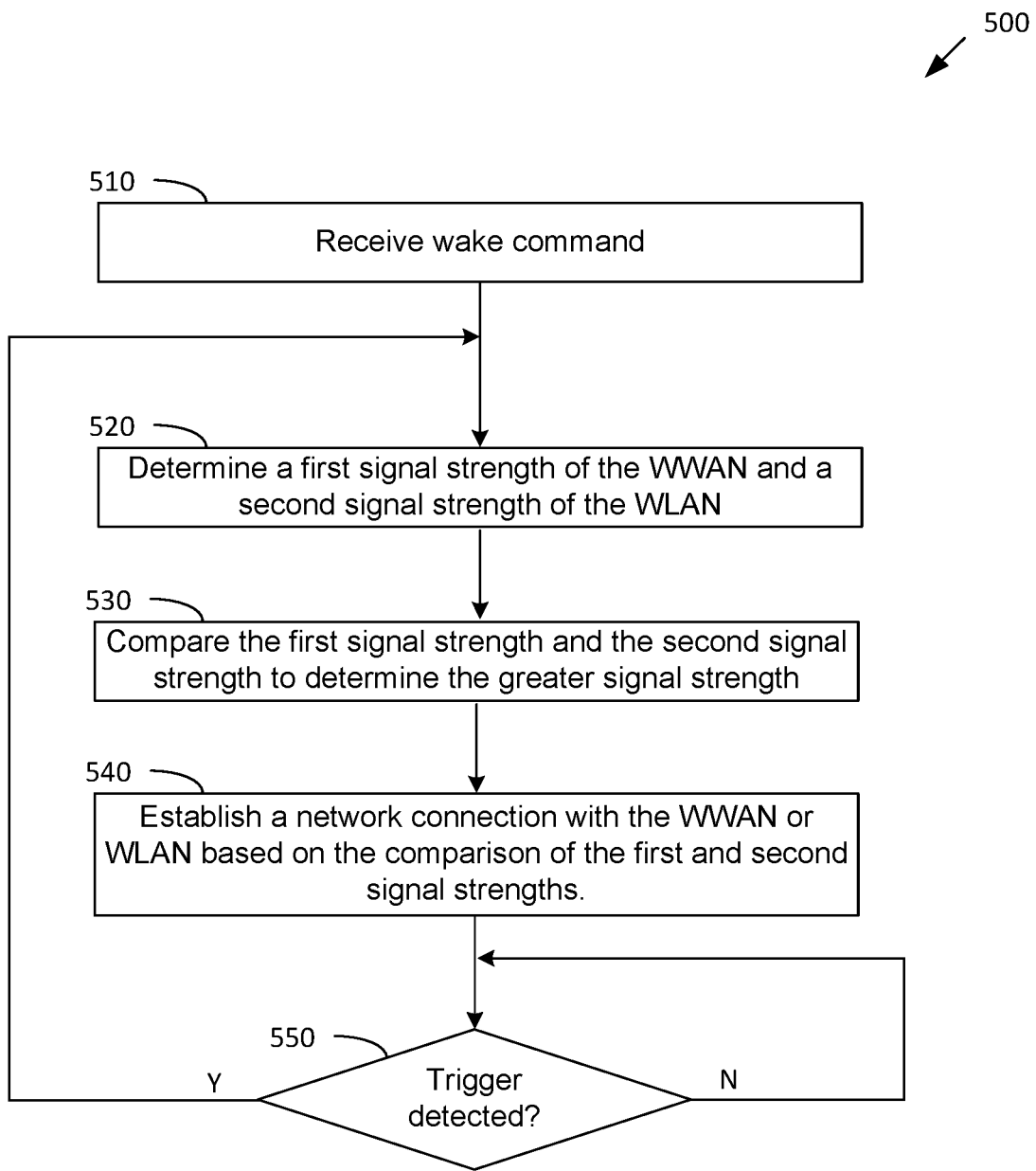
FIG. 5 is a flow diagram of method steps for determining whether to connect to the WWAN or the WLAN, according to various embodiments.

FIG. 5 is a flow diagram of method steps for determining whether to connect to the WWAN or the WLAN, according to various embodiments. Although the method steps are described in conjunction with the systems of FIGS. 1-2, persons skilled in the art will understand that any system configured to perform the method steps, in any order, is within the scope of the present disclosure. In some embodiments, the method 500 of FIG. 5 is performed by an audio processing application 112 executing on the portable audio device 100.

The method 500 comprises an alternative or supplemental embodiment for determining whether to connect to the WWAN or the WLAN than the embodiments described in relation to FIGS. 1-4. In this embodiment, the method 500 of FIG. 5 may execute in parallel with the method 300 of FIG. 3 and the method 400 of FIG. 4. The method 500 may include a separate method that executes in the background to continually monitor signal strengths of the WWAN or the WLAN and connect to the WWAN or the WLAN based on their respective signal strengths. In this manner, the method 500 may continually monitor the signal strengths of the WWAN or the WLAN and seamlessly transition network connections between the WWAN and the WLAN while receiving voice queries from the user in the normal power mode. In such embodiments, the method 500 of FIG. 5 is initiated/triggered upon receiving a wake command at step 320—Yes of the method 300 of FIG. 3. Further, in such embodiments, step 340 (determining whether to connect to the WWAN 202 or the WLAN 204) of the method 300 of FIG. 3 is not executed. Rather, the method 500 of FIG. 5 could continually execute in parallel in the background to continually monitor the signal strengths of the WWAN or WLAN and transition between the WWAN or WLAN, if necessary.

As shown, the method 500 begins at step 510, when the audio processing application 112 receives a wake command. As noted above, in some embodiments, step 510 corresponds to step 320—Yes of the method 300 of FIG. 3. At step 520, the audio processing application 112 then determines a first signal strength of the WWAN 202 and a second signal strength of the WLAN 204. The first signal strength may comprise the signal strength between the portable audio device 100 and the WWAN 202 that is determined via the wireless modem 155. The second signal strength may comprise the signal strength between the portable audio device 100 and the WLAN 204 that is determined via the network card 150. At step 530, the audio processing application 112 then compares the first signal strength of the WWAN 202 and the second signal strength of the WLAN 204 to determine which signal strength is greater.

At step 540, the audio processing application 112 establishes a network connection with either the WWAN 202 or WLAN 204, based on the comparison of the first and second signal strengths. For example, the audio processing application 112 may establish a network connection with the WWAN 202 if, at step 530, the first signal strength of the WWAN 202 is determined to be greater than the second signal strength of the WLAN 204. By contrast, the audio processing application 112 may establish a network connection with the WLAN 204 if, at step 530, the second signal strength of the WLAN 204 is determined to be greater than the first signal strength of the WWAN 202.

At step 550, the audio processing application 112 then determines if a trigger event is detected. The detection of a trigger event causes the audio processing application 112 to again evaluate and determine whether to connect to the WWAN 202 or WLAN 204 based on their respective signal strengths. If, at step 550, a trigger event is detected, then the method 500 continues at step 520, whereby the audio processing application 112 determines the signal strengths of the WWAN 202 and WLAN 204, compares the signal strengths, and establishes a network connection with either the WWAN 202 or WLAN 204, depending on which network has the greater signal strength. If, at step 550, a trigger event is not detected, then the method 500 continues at step 550 whereby the audio processing application 112 continues to monitor for a trigger event.

In some embodiments, a trigger event may include the expiration of a predetermined time period. In such embodiments, the method 500 may continually monitor the signal strengths of the WWAN 202 and WLAN 204 and establish a network connection with the WWAN 202 or WLAN 204 based on the their respective signal strengths at predetermined time intervals.

In some embodiments, a trigger event comprises determining that a signal strength for a currently connected network has fallen below a predetermined threshold level. For example, if the portable audio device 100 is currently connected with the WWAN 202, but the audio processing application 112 detects that the signal strength of the WWAN 202 has fallen below the threshold level, then a trigger event would be detected. In these embodiments, the method 500 may continually monitor the signal strength of the network (WWAN 202 or WLAN 204) to which the portable audio device 100 is currently connected to detect whether the current signal strength falls below the threshold level. If the current signal strength falls below the threshold level, then the audio processing application 112 determines the signal strengths of the WWAN 202 and WLAN 204, compares the signal strengths, and establishes a network connection with the WWAN 202 or WLAN 204 having the greater signal strength.

In some embodiments, a trigger event comprises detection of a schedule event of the user. In these embodiments, the trigger event is based on knowledge of a schedule of the user. For example, a schedule event may specify that the user is to leave a particular location X within a predetermined time period (e.g., in the next 5 minutes). Upon detecting the schedule event (comprising a trigger event), the method 500 may then determine the signal strengths of the WWAN 202 and WLAN 204, compare the signal strengths, and establish a network connection with the WWAN 202 or WLAN 204 having the greater signal strength.

In some embodiments, a trigger event comprises detection of movement of the portable audio device 100 that exceeds a predetermined threshold distance. The movement of the portable audio device 100 may be detected by a motion device 175 (shown in FIG. 1). The motion device 175 may comprise a GPS or other location sensitive device. In these embodiments, the trigger event is detected when the motion device 175 detects that the portable audio device 100 has moved a predetermined threshold distance. If the portable audio device 100 has moved the predetermined threshold distance, then the method 500 may determine the signal strengths of the WWAN 202 and WLAN 204, compare the signal strengths, and establish a network connection with the WWAN 202 or WLAN 204 having the greater signal strength.

In further embodiments, a default network (WWAN 202 or WLAN 204) may be set by the audio processing application 112 or the user. In these embodiments, the audio processing application 112 may first attempt to establish a network connection with the default network, if available. If the default network is not available, then the audio processing application 112 may attempt to establish a network connection with the other network. For example, the WWAN 202 may be set as the default network if the WLAN option is a new, password protected network, which requires an enrollment process, the WLAN is crowded, running slow, dropping, or otherwise problematic, and/or the user has an unlimited WWAN 202 data plan (so price is not a factor for the WWAN 202). In another example, the WLAN 204 may be set as the default network if the user does not have an unlimited WWAN 202 data plan (so price is a factor for the WWAN 202).

In sum, the embodiments described herein relate to a portable audio device that includes a network card able to connect with a WLAN and a wireless modem to connect to a WWAN. The portable audio device may communicate with a voices services platform via the network card and WLAN or the wireless modem and WWAN. In some embodiments, when the portable audio device does not have access to the WLAN, the portable audio device can process and respond to voice queries by communicating with the voice services platform via the wireless modem and WWAN. The portable audio device 100 also includes a battery 140 that provides the power needed for the various hardware and software components of the portable audio device 100 to perform the advanced voice functions and other functions described herein. To conserve battery power, the portable audio device 100 may be placed in a low-power state while continuously monitoring for a wake command. When the wake command is received, the portable audio device 100 may be transitioned to a normal-power state to receive and process voice queries from a user.

At least one advantage of the disclosed approach is that the portable audio device is able to process voice queries and provide a response to the voice queries even when the portable audio device is not within range of a WLAN and is not receiving power from a wall outlet of a house or building. In particular, the portable audio device is able to receive voice queries, communicate with a voice services platform, and provide a response to the voice queries when the portable audio device is not within range of a WLAN, such as a Wi-Fi network. Further, the battery of the portable audio device allows the portable audio device to provide advanced voice functionality in areas that are outside the range of a WLAN. Thus, the portable audio device provides true portability and may be used in any environment, such as within a home or building environment or outside of the home or building environment.

1. In some embodiments, a portable audio device comprises a set of one or more far-field microphones configured to acquire a voice query; a set of one or more speakers; a wireless modem configured to connect to a wireless wide area network (WWAN); a memory that includes an audio processing application; and a processor that is coupled to the memory and, when executing the audio processing application, is configured to: generate a data request based on the voice query; transmit the data request to the WWAN via the wireless modem; receive a data response associated with the data request from the WWAN via the wireless modem; generate an audio signal based on the data response; and transmit the audio signal to the set of speakers to generate audio output.

2. The portable audio device of clause 1, further comprising a battery for powering at least one of the set of microphones, the set of speakers, and the wireless modem.

3. The portable audio device of clauses 1 or 2, wherein the processor is configured to generate the data request based on the voice query by processing the voice query using natural language processing techniques.

4. The portable audio device of any of clauses 1-3, wherein the set of speakers comprises a first driver for a first frequency range and a second driver for a second frequency range.

5. The portable audio device of any of clauses 1-4, wherein: the voice query comprises a request for a media item or information item; and the data response comprises the media item or information item.

6. The portable audio device of any of clauses 1-5, further comprising a subscriber identity module (SIM) device, wherein the processor is further configured to communicate with the WWAN based on information received via the SIM device.

7. The portable audio device of any of clauses 1-6, further comprising a network card to connect to a wireless local area network (WLAN), wherein the processor is further configured to: before generating the data request, continuously monitor for a wake command to be acquired by the set of microphones; and in response to detecting the wake command, determine to connect to the WWAN via the wireless modem and to not connect to the WLAN via the network card.

8. The portable audio device of any of clauses 1-7, wherein the processor is further configured to: before generating the data request, continuously monitor for a wake command to be acquired by the set of microphones while the portable audio device is in a low-power state; and in response to detecting the wake command, transition the portable audio device from the low-power state to a normal-power state.

9. The portable audio device of any of clauses 1-8, wherein: in the low-power state, a first set of components of the portable audio device used for monitoring for the wake command is powered on, wherein a second set of components of the portable audio device that are not used for monitoring for the wake command is powered off; and in the normal-power state, at least one component of the second set of components is powered on.

10. In some embodiments, a computer-readable storage medium including instructions that, when executed by a processor, cause the processor to process a voice query, by performing the steps of: acquiring, via a set of one or more far-field microphones of a portable audio device, the voice query; generating a data request based on the voice query; transmitting the data request to a wireless wide area network (WWAN) via a wireless modem included in the portable audio device; receiving a data response associated with the data request from the WWAN via the wireless modem; generating an audio signal based on the data response; and transmitting the audio signal to a set of speakers included in the portable audio device to generate audio output.

11. The computer-readable storage medium of clause 10, wherein the portable audio device comprises a battery for powering a first set of components of the portable audio device in a low-power state and powering a second set of components of the portable audio device in a normal-power state.

12. The computer-readable storage medium of clauses 10 or 11, wherein generating the data request based on the voice query comprises processing the voice query using natural language processing techniques.

13. The computer-readable storage medium of any of clauses 10-12, wherein the set of speakers comprises a crossover, a first driver for a first frequency range, and a second driver for a second frequency range.

14. The computer-readable storage medium of any of clauses 10-13, wherein: the voice query comprises a request for an audio-based media item or information item; and the data response comprises the audio-based media item or information item.

15. The computer-readable storage medium of any of clauses 10-14, wherein the portable audio device comprises a subscriber identity module (SIM) device, the portable audio device configured to communicate with the WWAN based on information received via the SIM device.

16. The computer-readable storage medium of any of clauses 10-15, wherein the portable audio device comprises a network adapter to connect to a wireless local area network (WLAN), further comprising the step of, prior to transmitting the data request via the wireless modem, determining that the WLAN is not within range.

17. The computer-readable storage medium of any of clauses 10-16, further comprising the steps of: before generating the data request, continuously monitoring for a wake command to be acquired by the set of microphones while the portable audio device is in a low-power state; and in response to detecting the wake command, transitioning the portable audio device from the low-power state to a normal-power state.

18. The computer-readable storage medium of any of clauses 10-17, wherein: in the low-power mode, a first subset of microphones in the set of microphones are powered on for monitoring for the wake command, wherein a second subset of microphones in the set of microphones are powered off; and in the normal-power mode, the second subset of microphones is powered on.

19. In some embodiments, a portable audio device, comprising: a set of one or more microphones configured to acquire a voice query; a set of one or more speakers; a wireless modem configured to connect to a wireless wide area network (WWAN); a memory that includes an audio processing application; and a processor that is coupled to the memory and, when executing the audio processing application, is configured to: generate a data request based on the voice query; transmit the data request to the WWAN via the wireless modem; receive a data response associated with the data request from the WWAN via the wireless modem; generate an audio signal based on the data response; and transmit the audio signal to the set of speakers to generate sound based on the audio signal, wherein the portable audio device does not include a video display screen.

20. The portable audio device of clause 19, wherein the portable audio device does not include video processing capabilities.

21. The portable audio device of clauses 19 or 20, further comprising a network card to connect to a wireless local area network (WLAN), wherein the processor is further configured to, before connecting to the wireless wide area network (WWAN), determine that a signal strength of the WWAN is greater than a signal strength of the WLAN.

22. The portable audio device of any of clauses 19-21, wherein the processor is further configured to: detect a trigger event; and in response to detecting the trigger event, determine that signal strength of the WLAN is greater than a signal strength of the WWAN and establishing a network connection with the WLAN.

23. The portable audio device of any of clauses 19-22, wherein the trigger event comprises at least one of an expiration of a predetermined time period, a signal strength for a currently connected network falling below a predetermined threshold level, a schedule event of the user, and movement of the portable audio device that exceeds a predetermined threshold distance.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "component," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A portable audio device, comprising:
a set of one or more far-field microphones configured to acquire a wake command and a voice query;
a set of one or more speakers;
a wireless modem configured to connect to a wireless wide area network (WWAN);
a memory that includes an audio processing application; and
a processor that is coupled to the memory and, when executing the audio processing application, is configured to:
detect the wake command;
in response to detecting the wake command, connect to the WWAN via the wireless modem and to not connect to a wireless local area network (WLAN);
generate a data request based on the voice query;
transmit the data request to the WWAN via the wireless modem;

receive a data response associated with the data request from the WWAN via the wireless modem;
generate an audio signal based on the data response; and
transmit the audio signal to the set of speakers to generate audio output.

2. The portable audio device of claim 1, further comprising a battery for powering at least one of the set of microphones, the set of speakers, or the wireless modem.

3. The portable audio device of claim 1, wherein the processor is configured to generate the data request based on the voice query by processing the voice query using natural language processing techniques.

4. The portable audio device of claim 1, wherein the set of speakers comprises a first driver for a first frequency range and a second driver for a second frequency range.

5. The portable audio device of claim 1, wherein:
the voice query comprises a request for a media item or information item; and
the data response comprises the media item or information item.

6. The portable audio device of claim 1, further comprising a subscriber identity module (SIM) device, wherein the processor is further configured to communicate with the WWAN based on information received via the SIM device.

7. The portable audio device of claim 1, further comprising a network card to connect to the WLAN, wherein the processor is further configured to:
before generating the data request, continuously monitor for the wake command to be acquired by the set of microphones.

8. The portable audio device of claim 1, wherein the processor is further configured to:
before generating the data request, continuously monitor for the wake command to be acquired by the set of microphones while the portable audio device is in a low-power state; and
in response to detecting the wake command, transition the portable audio device from the low-power state to a normal-power state.

9. The portable audio device of claim 8, wherein:
in the low-power state, a first set of components of the portable audio device used for monitoring for the wake command is powered on, wherein a second set of components of the portable audio device that are not used for monitoring for the wake command is powered off; and
in the normal-power state, at least one component of the second set of components is powered on.

10. A non-transitory computer-readable storage medium including instructions that, when executed by a processor, cause the processor to process a voice query, by performing the steps of:
detecting, via a set of one or more far-field microphones of a portable audio device, a wake command;
in response to detecting the wake command, connecting to a wireless wide area network (WWAN) via a wireless modem included in the portable audio device and to not connect to a wireless local area network (WLAN);
acquiring, via the set of one or more far-field microphones of the portable audio device, the voice query;
generating a data request based on the voice query;
transmitting the data request to the WWAN via the wireless modem;
receiving a data response associated with the data request from the WWAN via the wireless modem;
generating an audio signal based on the data response; and
transmitting the audio signal to a set of speakers included in the portable audio device to generate audio output.

11. The non-transitory computer-readable storage medium of claim 10, wherein the portable audio device comprises a battery for powering a first set of components of the portable audio device in a low-power state and powering a second set of components of the portable audio device in a normal-power state.

12. The non-transitory computer-readable storage medium of claim 10, wherein generating the data request based on the voice query comprises processing the voice query using natural language processing techniques.

13. The non-transitory computer-readable storage medium of claim 10, wherein the set of speakers comprises a crossover, a first driver for a first frequency range, and a second driver for a second frequency range.

14. The non-transitory computer-readable storage medium of claim 10, wherein:
the voice query comprises a request for an audio-based media item or information item; and
the data response comprises the audio-based media item or information item.

15. The non-transitory computer-readable storage medium of claim 10, wherein the portable audio device comprises a subscriber identity module (SIM) device, the portable audio device configured to communicate with the WWAN based on information received via the SIM device.

16. The non-transitory computer-readable storage medium of claim 10, wherein the portable audio device comprises a network adapter to connect to the WLAN, further comprising the step of, prior to transmitting the data request via the wireless modem, determining that the WLAN is not within range.

17. The non-transitory computer-readable storage medium of claim 10, further comprising the steps of:
before generating the data request, continuously monitoring for the wake command to be acquired by the set of microphones while the portable audio device is in a low-power state; and
in response to detecting the wake command, transitioning the portable audio device from the low-power state to a normal-power state.

18. The non-transitory computer-readable storage medium of claim 17, wherein:
in the low-power state, a first subset of microphones in the set of microphones are powered on for monitoring for the wake command, wherein a second subset of microphones in the set of microphones are powered off; and
in the normal-power state, the second subset of microphones is powered on.

19. A portable audio device, comprising:
a set of one or more microphones configured to acquire a wake command and a voice query;
a set of one or more speakers;
a wireless modem configured to connect to a wireless wide area network (WWAN);
a memory that includes an audio processing application; and
a processor that is coupled to the memory and, when executing the audio processing application, is configured to:
detect the wake command;
in response to detecting the wake command, connect to the WWAN via the wireless modem and to not connect to a wireless local area network (WLAN);

generate a data request based on the voice query;

transmit the data request to the WWAN via the wireless modem;

receive a data response associated with the data request from the WWAN via the wireless modem;

generate an audio signal based on the data response; and transmit the audio signal to the set of speakers to generate sound based on the audio signal, wherein the portable audio device does not include a video display screen.

20. The portable audio device of claim 19, wherein the portable audio device does not include video processing capabilities.

21. The portable audio device of claim 19, further comprising a network card to connect to the WLAN, wherein the processor is further configured to, before connecting to the wireless wide area network (WWAN), determine that a signal strength of the WWAN is greater than a signal strength of the WLAN.

22. The portable audio device of claim 21, wherein the processor is further configured to:

detect a trigger event; and in response to detecting the trigger event, determine that the signal strength of the WLAN is greater than the signal strength of the WWAN and establishing a network connection with the WLAN.

23. The portable audio device of claim 22, wherein the trigger event comprises at least one of an expiration of a predetermined time period, a signal strength for a currently connected network falling below a predetermined threshold level, a schedule event of a user, or movement of the portable audio device that exceeds a predetermined threshold distance.

* * * * *